United States Patent
Diehl

(10) Patent No.: US 11,756,218 B2
(45) Date of Patent: Sep. 12, 2023

(54) SECURE DISTRIBUTION OF MULTI-RESOLUTION POINT CLOUD

(71) Applicants: Sony Corporation, Tokyo (JP); Sony Pictures Entertainment Inc., Culver City, CA (US)

(72) Inventor: Eric Diehl, Culver City, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 516 days.

(21) Appl. No.: 16/596,580

(22) Filed: Oct. 8, 2019

(65) Prior Publication Data

US 2021/0104054 A1 Apr. 8, 2021

(51) Int. Cl.
G06T 7/30 (2017.01)
H04L 9/08 (2006.01)
H04L 9/32 (2006.01)

(52) U.S. Cl.
CPC .............. G06T 7/30 (2017.01); H04L 9/085 (2013.01); H04L 9/3242 (2013.01); H04L 2209/16 (2013.01)

(58) Field of Classification Search
CPC ......... G06T 7/30; H04L 9/085; H04L 9/3242; H04L 2209/16; H04L 9/0822; H04L 9/14; H04L 9/3239; H04L 63/0428; H04L 9/0869
USPC ....................................................... 382/154
See application file for complete search history.

(56) References Cited

U.S. PATENT DOCUMENTS

| 9,454,554 B1 | 9/2016 | St-Pierre et al. |
| 2005/0276416 A1* | 12/2005 | Zhu ................... H04N 21/26613 348/E7.056 |
| 2011/0150217 A1* | 6/2011 | Kim ................... H04N 21/2347 380/210 |
| 2017/0347122 A1* | 11/2017 | Chou ........................ G06T 9/00 |

(Continued)

FOREIGN PATENT DOCUMENTS

| CN | 106301760 A | 1/2017 |
| JP | H11098487 A | 4/1999 |

(Continued)

OTHER PUBLICATIONS

Jin et al., "3D Point Cloud Encryption through Chaotic Mapping," Beijing Electronic Science and Technology Institute, Sep. 2016 in 10 pages.

(Continued)

*Primary Examiner* — Neil R McLean
(74) *Attorney, Agent, or Firm* — Procopio, Cory, Hargreaves & Savitch LLP

(57) ABSTRACT

Distributing different resolution point clouds of a full resolution point cloud, including: applying a plurality of sieve functions to the full resolution point cloud (PC) to generate a plurality of partial point clouds (PCs), wherein the partial PCs are disjointed elements of the full resolution PC; scrambling each partial PC of the plurality of partial PCs using a respective one of a plurality of secret keys; and distributing at least one scrambled PC and a selected secret key to an intended recipient, wherein the selected secret key is selected based on an appropriate resolution determined for the intended recipient.

18 Claims, 9 Drawing Sheets

(56) References Cited

U.S. PATENT DOCUMENTS

2018/0197329 A1* 7/2018 Palais .................. G06T 17/00

FOREIGN PATENT DOCUMENTS

JP          2003324418 A    11/2003
WO     WO-2019078000 A1     4/2019

OTHER PUBLICATIONS

Hosseini et al., "Dynamic Adaptive Point Cloud Streaming," Packet Video'18, Jun. 12-15, 2018, Amsterdam, Netherlands, Apr. 8, 2019 in 7 pages.
Stefano Ferrari et al: "Reducing and Filtering Point Clouds With Enhanced Vector Quantization", IEEE Transactions on Neural Networks, Service Center, Piscataway, NJ, US, vol. 18, No. 1, Jan. 1, 2007 (Jan. 1, 2007), pp. 161-177, XP011148608.
Beugnon, S., Puech, W. and Pedeboy, J. P., From Visual Confidentiality To Transparent Format-Compliant Selective Encryption of 3D Objects, 2018 IEEE International Conference on Multimedia & Expo Workshops, 2018.7, pp. 1-6.
Gobbetti, E. and Marton, F., Layered Point Clouds: A Simple and Efficient Multiresolution Structure for Distributing and Rendering Gigantic Point-Sampled Models, Computers & Graphics, 2004.12, vol. 28, No. 6, pp. 815-826.

* cited by examiner

SECURE DISTRIBUTION OF MULTI-RESOLUTION POINT CLOUD

FIELD

The present disclosure relates to point cloud, and more specifically, to secure distribution of multi-resolution point cloud.

BACKGROUND

A point cloud (PC) is a set of data points in space, which provides a new method to describe a 3-dimensional (3-D) object or landscape. Thus, the PC, as a digital asset, has an intrinsic value, which can be subject to piracy if not adequately protected. Further, it may be of interest to distributors to deliver assets of the PC in different resolutions so that the distributor can apply better control of its delivery by allowing the user to access only the granted resolution.

One solution to the distribution issues noted above is to create one representation of the PC asset for each expected resolution and protect each representation independently. However, since the PC asset can be a large digital representation, creating one representation of the PC asset for each expected resolution can result in a much larger volume than the original one.

SUMMARY

The present disclosure provides for controlling the distribution of different resolutions of the same PC without increasing the overall size of the distributed content.

In one implementation, a point cloud distribution system is disclosed. The system includes: a plurality of sieve function generators configured to apply sieve functions on a full resolution point cloud (PC) to generate a plurality of partial point clouds (PCs), wherein the plurality of partial PCs is a group of disjointed elements which together makes up the full resolution PC; and a plurality of scramblers configured to scramble the plurality of partial PCs using a plurality of secret keys to produce a plurality of scrambled PCs.

In one implementation, the system further includes a distributor configured to distribute at least one scrambled PC and at least one selected secret key, wherein the selected secret key is selected based on an appropriate resolution determined for an intended recipient. In one implementation, a first secret key is selected for a first PC, a second secret key is selected for a second PC that is higher resolution than the first PC, and the first key can be derived from the second secret key. In one implementation, cascading secret keys of the plurality of secret keys are generated using one-way hashing functions starting from a secret key that can recreate the full resolution point cloud.

In another implementation, a system for generating a desired resolution point cloud is disclosed. The system includes: a plurality of descramblers configured to receive and descramble a plurality of scrambled point clouds (PCs) using at least one secret key to produce at least one partial PC; and a builder configured to receive and transform the at least one partial PC by recombining the at least one partial PC to form at least one combined partial PC and reformatting the at least one combined partial PC into a combined PC.

In one implementation, the combined PC has a format compliant with tools that will use the combined PC. In one implementation, the combined PC is the desired resolution PC. In one implementation, a first secret key is selected for a first PC, a second secret key is selected for a second PC that is higher resolution than the first PC, and the first key descrambles both the first PC and the second PC.

In another implementation, a method for distributing different resolution point clouds of a full resolution point cloud is disclosed. The method includes: applying a plurality of sieve functions to the full resolution point cloud (PC) to generate a plurality of partial point clouds (PCs), wherein the partial PCs are disjointed elements of the full resolution PC; scrambling each partial PC of the plurality of partial PCs using a respective one of a plurality of secret keys; and distributing at least one scrambled PC and a selected secret key to an intended recipient, wherein the selected secret key is selected based on an appropriate resolution determined for the intended recipient.

In one implementation, applying a plurality of sieve functions comprises decimating the full resolution PC to generate disjointed partial PCs using each sieve function of the plurality of sieve functions. In one implementation, disjointed partial PCs form the full resolution PC. In one implementation, a number of the plurality of sieve functions is equal to a number of the plurality of partial PCs. In one implementation, a number of the plurality of sieve functions is equal to a number of the plurality of secret keys. In one implementation, the selected secret key is able to descramble at least one of the at least one scrambled PC. In one implementation, a first secret key is selected for a first PC, a second secret key is selected for a second PC that is higher resolution than the first PC, and the first key can be derived from the second secret key.

In another implementation, an apparatus for distributing different resolution point clouds of a full resolution point cloud is disclosed. The apparatus includes: means for applying sieve functions to apply a plurality of sieve functions to the full resolution point cloud (PC) to generate a plurality of partial point clouds (PCs), wherein the partial PCs are disjointed elements of the full resolution PC; means for protecting to protect each partial PC of the plurality partial PCs using a respective one of a plurality of secret keys; and means for distributing to distribute at least one scrambled PC and a selected secret key to an intended recipient.

In one implementation, the selected secret key is selected based on an appropriate resolution determined for the intended recipient. In one implementation, only scrambled PCs that are necessary to descramble to the appropriate resolution for the selected key are distributed. In one implementation, the means for protecting is a scrambler. In one implementation, the means for protecting is an AES scrambler.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, since the point cloud (PC) asset can be a large digital representation, creating one representation of the PC asset for each expected resolution can result in a much larger volume than the original one. Certain implementations of the present disclosure provide for controlling the distribution of different resolutions of the same PC without increasing the overall size of the distributed content. After reading these descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, the full resolution PC is split into disjointed elements (one element per expected resolution) using "sieve" functions. Further each disjointed element is protected using a secret key unique to each element.

Figure 1:
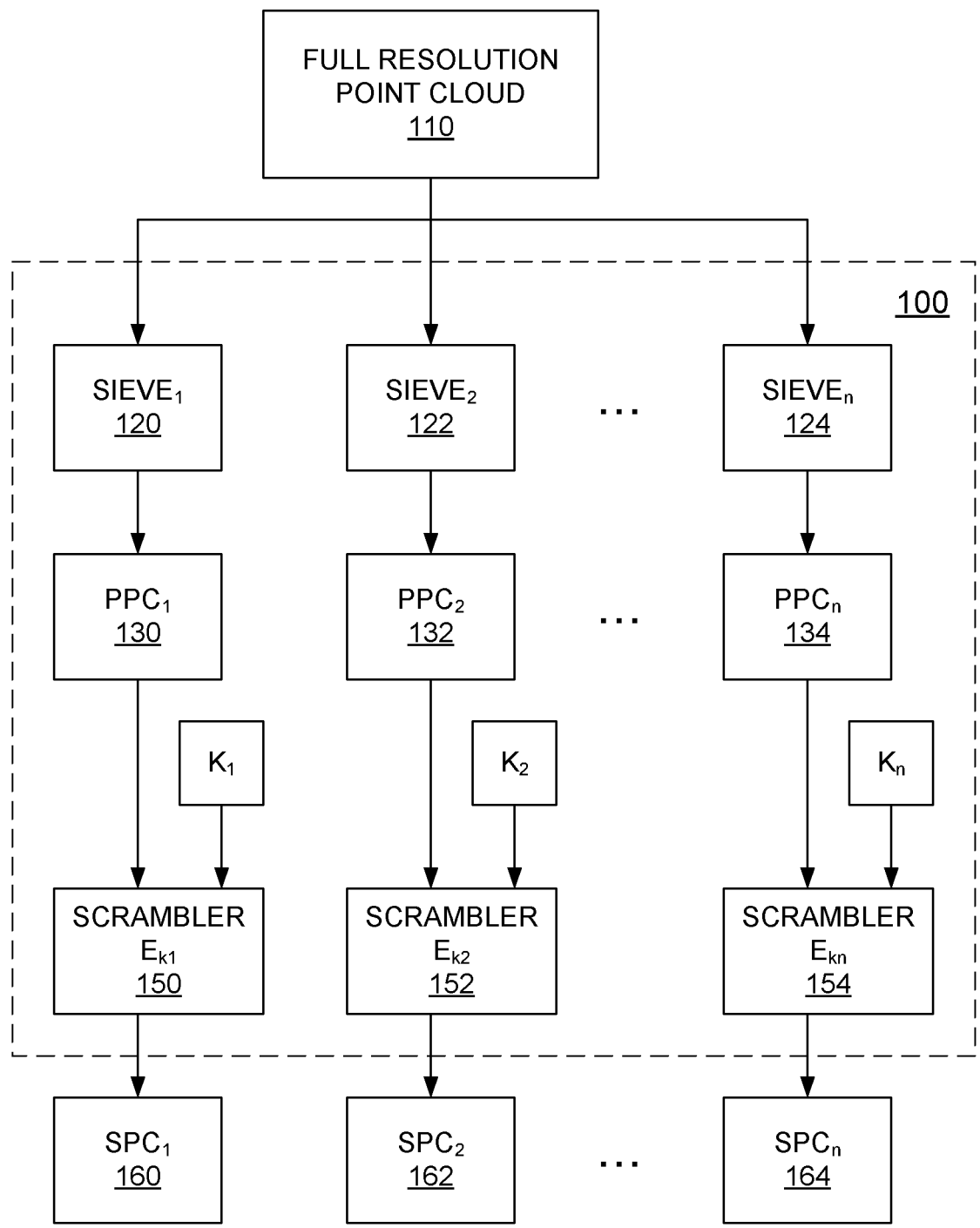
FIG. 1 is a block diagram of a PC distribution system in accordance with one implementation of the present disclosure.

FIG. 1 is a block diagram of a PC distribution system 100 in accordance with one implementation of the present disclosure. In one implementation, the PC distribution system 100 includes n sieve function generators (sieve$_1$, sieve$_2$, ... sieve$_n$) 120, 122, 124 and n scramblers (E$_{k1}$, E$_{k2}$, ... E$_{kn}$) 150, 152, 154. Further, the PC distribution system 100 receives and transforms the full resolution PC 110 into n elements of scrambled PCs 160, 162, 164.

In the illustrated implementation of FIG. 1, the sieve function generators (sieve$_1$, sieve$_2$, ... sieve$_n$) 120, 122, 124 are applied to the full resolution PC 110 to generate n partial PCs (PPC$_1$, PPC$_2$, ... PPC$_n$) 130, 132, 134. Thus, the sieve function generators split the full resolution PC 110 into n disjointed elements. That is, sieve; function 120 decimates the full resolution PC 110 and keeps some points following a given logic, for example, an expected density of points. Thus, PPC$_1$=Sieve$_1$(fullPC). Accordingly, the sieve function generators (sieve$_1$, sieve$_2$, ... sieve$_n$) 120, 122, 124 generate disjointed partial PCs (PPC$_1$, PPC$_2$, ... PPC$_n$) 130, 132, 134, which cover the entire full resolution PC 110. Therefore, following are true:

$$\text{Sieve}_1(\text{FullPC}) \cap \text{Sieve}_2(\text{FullPC}) \cap \ldots \cap \text{Sieve}_n (\text{FullPC}) = \phi \quad [1]$$

$$\text{Sieve}_1(\text{FullPC}) \cup \text{Sieve}_{2(FullPC)} \cup \ldots \cup \text{Sieve}_n (\text{FullPC}) = \text{FullPC}. \quad [2]$$

In the illustrated implementation of FIG. 1, the scrambler (E$_{k1}$) 150 protects PPC$_1$ 130 using a secret key K$_1$ to produce a scrambled PC (SPC$_1$) 160. In one implementation, the scrambler 150 is a cryptographic encryption or a geometric transformation. Thus, SPC$_1$=E$_{K_1}$(PPC$_1$)=E$_{K_1}$(Sieve$_1$(fullPC)). The scramblers (E$_{k2}$ ... E$_{kn}$) 152, 154 similarly protect the other partial PCs using corresponding secret keys (K$_2$ ... K$_n$) to produce the other scrambled PCs (SPC$_2$, ... SPC$_n$) 162, 164. Therefore, by generalization, SPC$_n$=E$_{K_n}$(PPC$_n$)=E$_{K_n}$(Sieve$_n$(fullPC)). Once n scrambled PCs (SPC$_1$, SPC$_2$, ... SPC$_n$) 160, 162, 164 have been produced using the keys (K$_1$, K$_2$, ... K$_n$), the scrambled PCs and a selected key can be distributed to an intended receiver based on an appropriate resolution determined for the intended receiver. However, it should be noted that all scrambled PCs can be distributed without any risk, as along as the selected key is selected based on the appropriate resolution determined for the intended receiver.

Figure 2:
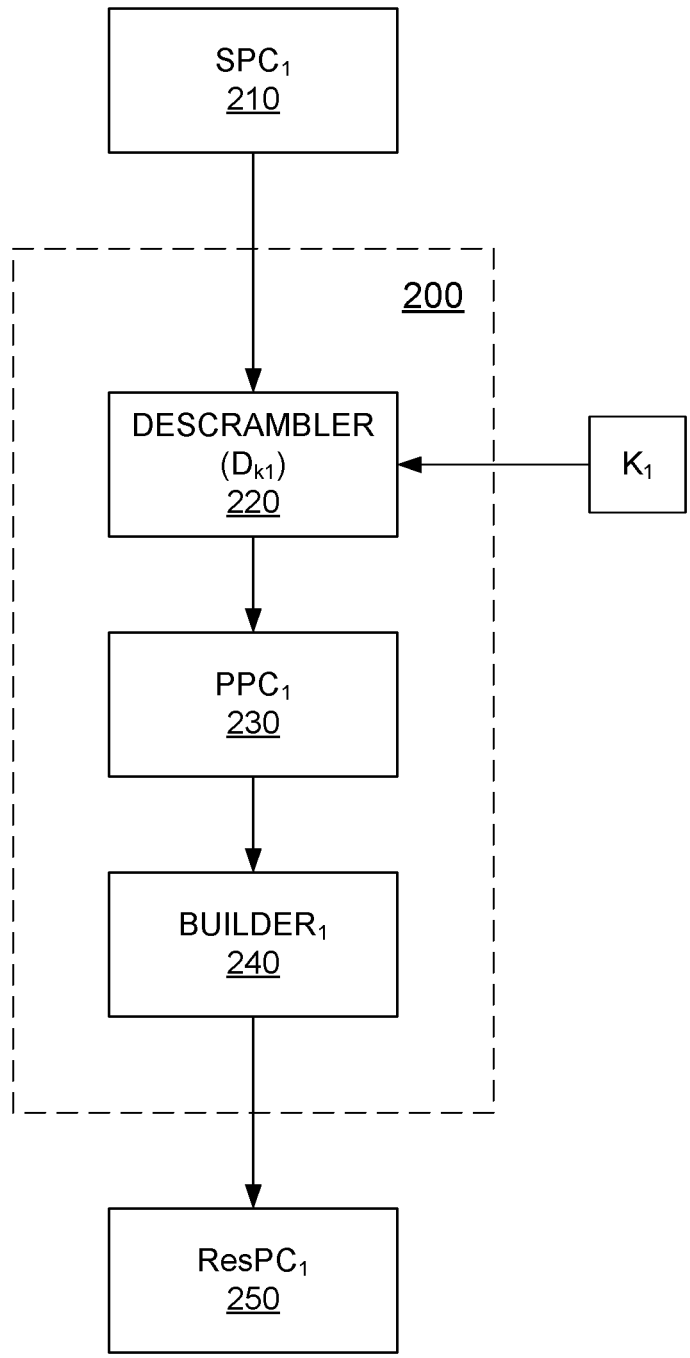
FIG. 2 is a block diagram of a system for generating a lowest resolution PC ($ResPC_1$) in accordance with one implementation of the present disclosure.

FIG. 2 is a block diagram of a system 200 for generating a lowest resolution PC (ResPC$_1$) in accordance with one implementation of the present disclosure. In the illustrated implementation of FIG. 2, the system 200 includes a descrambler 220 and a builder 240.

In one implementation, the descrambler (Du) 220 receives and descrambles a lowest resolution scrambled PC (SPC$_1$) 210 using a secret key K$_1$. If the key K$_1$ is a proper key for SPC$_1$) 210, the descrambler (D$_{k1}$) 220 outputs a partial PC (PPC$_1$) 230 as follows: PPC$_1$=D$_{K_1}$(SPC$_1$). The builder 240 then receives and transforms the partial PC (PPC$_1$) 230 into the lowest resolution PC (ResPC$_1$) by reformatting the PPC$_1$ into a format compliant with tools that will use the PC.

Figure 3:
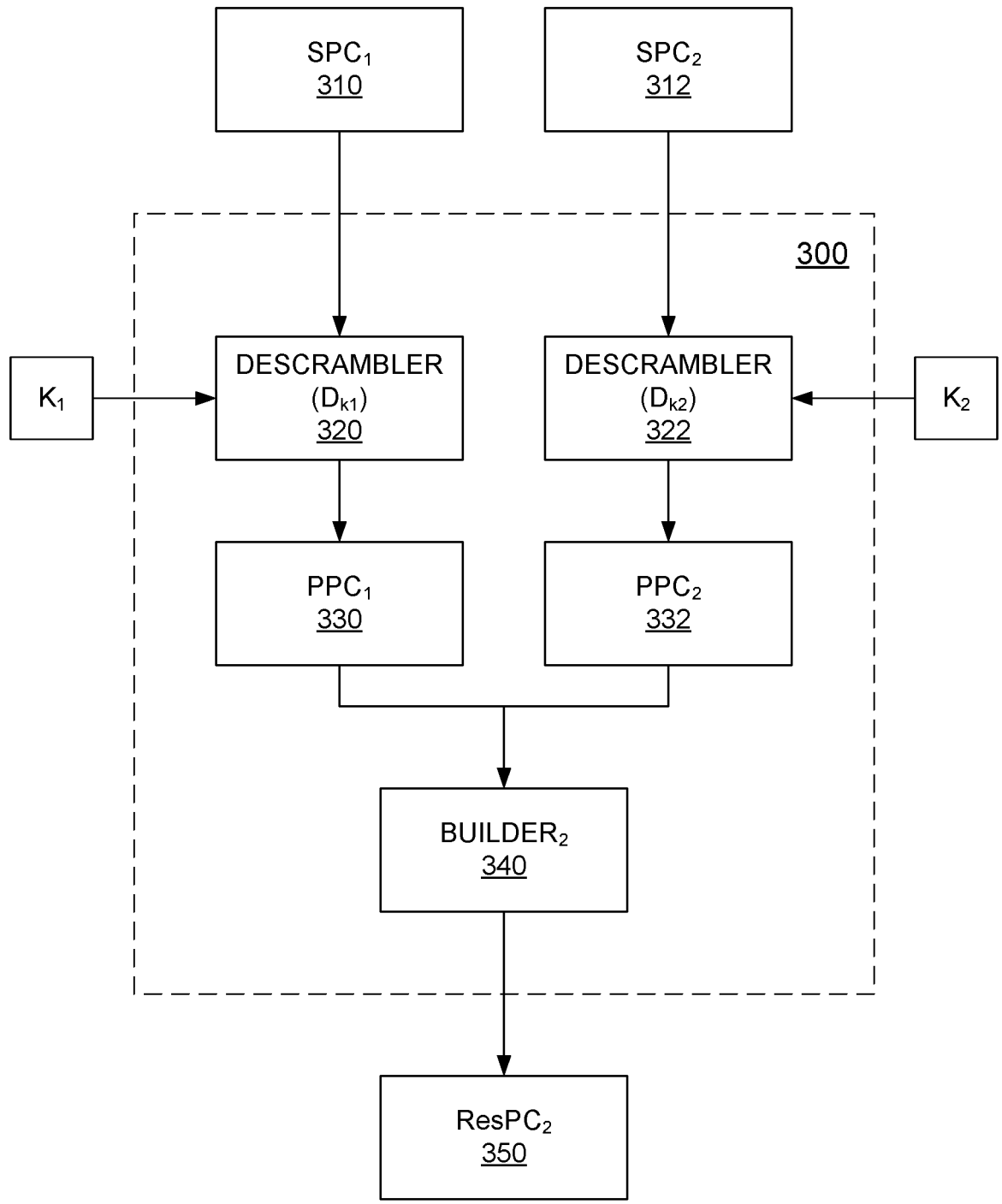
FIG. 3 is a block diagram of a system for generating a first intermediate resolution PC (ResPC$_2$) in accordance with one implementation of the present disclosure.

FIG. 3 is a block diagram of a system 300 for generating a first intermediate resolution PC (ResPC$_2$) in accordance with one implementation of the present disclosure. In the illustrated implementation of FIG. 3, the system 300 includes descramblers (D$_{k1}$, D$_{k2}$) 320, 322 and a builder 340.

In one implementation, the descramblers (D$_{k1}$, D$_{k2}$) 320, 322 receive and descramble two scrambled PCs (SPC$_1$ and SPC$_2$) 310, 312 using two secret keys (K$_1$ and K$_2$), respectively. Thus, the descrambler (D$_{k1}$) 320 descrambles the scrambled PC$_1$ (SPC$_1$) 310 using the secret key K$_1$ to produce the partial PC$_1$ (PPC$_1$) 330, while the descrambler (D$_{k2}$) 322 descrambles the scrambled PC$_2$ (SPC$_2$) 312 using the secret key K$_2$ to produce the partial PC$_2$ (PPC$_2$) 332. The builder 340 then receives and transforms the partial PC$_1$ (PPC$_1$) 330 and the partial PC$_2$ (PPC$_2$) 332 into the first intermediate resolution PC (ResPC$_2$) 350 by recombining the partial PC$_1$ (PPC$_1$) 330 and the partial PC$_2$ (PPC$_2$) 332, and reformatting the combined partial PC into a format compliant with tools that will use the PC. The following equation summarizes the system 300:

$$\text{ResPC}_2 = \text{Builder}_2(\text{PPC}_1, \text{PPC}_2) = \text{Builder}_2(D_{K_1}(\text{SPC}_1), D_{K_2}(\text{SPC}_2)). \quad (3)$$

By extension, the full resolution PC can be expressed as follows:

$$FullPC = ResPC_n = Builder_n(PPC_1, PPC_2, \ldots, PPC_n) \quad [4]$$
$$= Builder_n(D_{K_1}(SPC_1), D_{K_2}(SPC_2), \ldots, D_{K_n}(SPC_n)).$$

In some implementations, the sieve functions may be associated with an arithmetic compression function. In that case, the size of the partial PC is smaller due to the compression. Thus, in this case, the builder function first decompresses the descrambled PC before recombining them.

Figure 4:
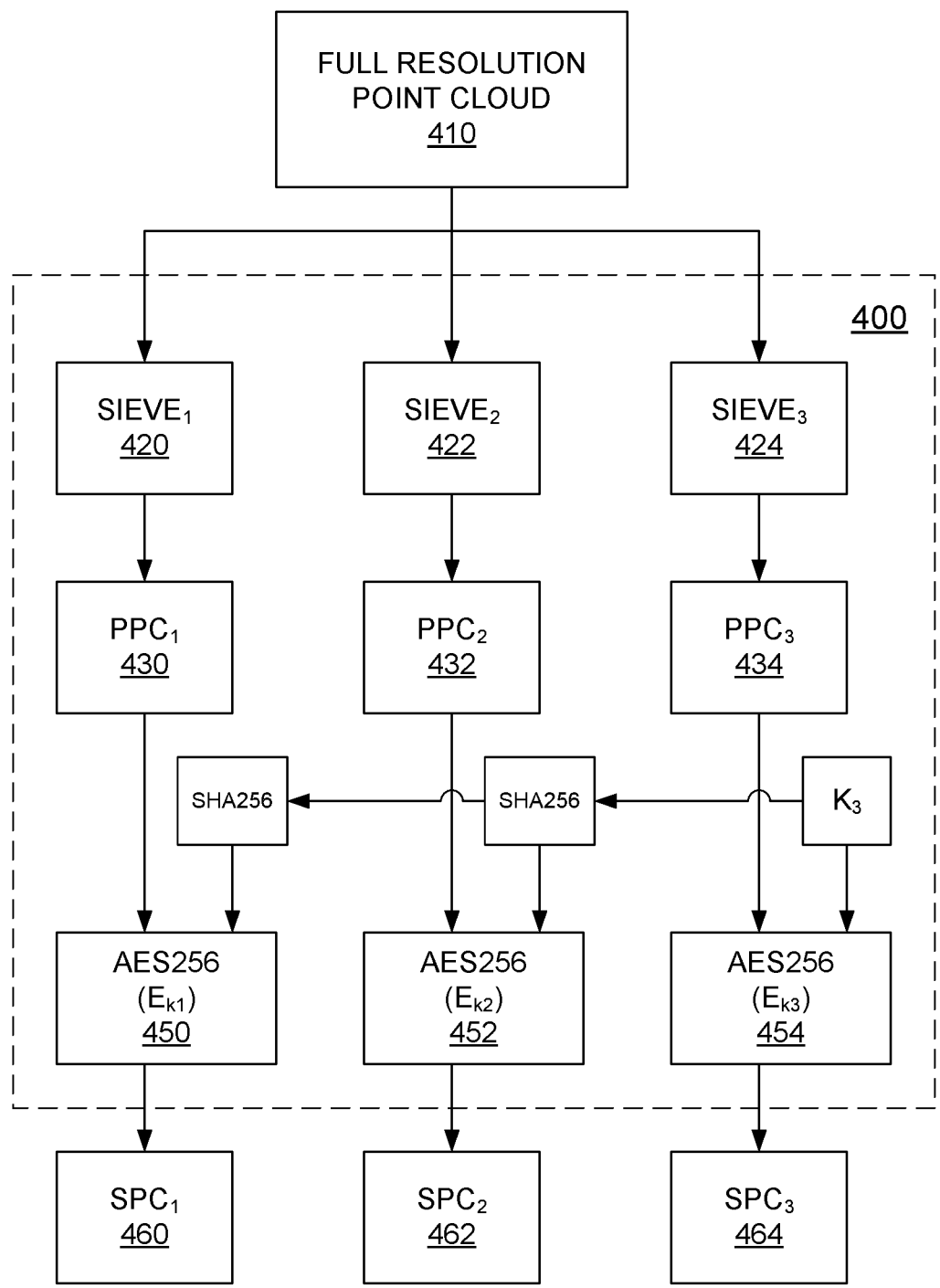
FIG. 4 is a block diagram of a PC distribution system in accordance with another implementation of the present disclosure.

FIG. 4 is a block diagram of a PC distribution system 400 in accordance with another implementation of the present disclosure. In the illustrated implementation of FIG. 4, a basic data structure (e.g., a linear succession of points) is used to represent the PC in which three resolutions are supported: lowest, intermediate, and full. The lowest resolution is 1/16 of the full resolution and the intermediate resolution is 1/4 of the full resolution.

In the illustrated implementation of FIG. 4, the distribution system 400 includes three sieve functions (sieve$_1$, sieve$_2$, sieve$_3$) 420, 422, 424 and three scramblers (i.e., AES256s E$_{k1}$, E$_{k2}$, E$_{k3}$) 450, 452, 454. In FIG. 4, sieve functions 420, 422, 424 operate in slices of 16 points. As shown in Table 1, sieve$_1$ 420 keeps the first point of each slice, sieve$_2$ 422 keeps the 5th, 9th and 13th points of each slice, and sieves 424 keeps the 2nd, 3rd, 4th, 6th, 7th, 8th, 10th, 11th, 12th, 14th, 15th and 16th points of each slice. Further, the scrambler 450 is the cryptographic encryption AES256.

accordance with one implementation of the present disclosure. In the illustrated implementation of FIG. 5, the system 500 includes an AES256 descrambler (D$_{k1}$) 520 and a builder 540.

In one implementation, the AES256 descrambler (D$_{k1}$) 520 receives and descrambles a lowest resolution scrambled PC (SPC$_1$) 510 using a secret key K$_1$. If the key K$_1$ is a proper key for SPC$_1$ 510, the AES256 descrambler (D$_{k1}$) 520 outputs a partial PC (PPC$_1$) 530. The builder 540 then receives and transforms the partial PC (PPC$_1$) 530 into the lowest resolution PC (ResPC$_1$) 550. However, in this implementation, the builder 540 does not need to modify the partial PC (PPC$_1$) 530. Thus, the function of the builder 540 is the identity function.

Figure 6:
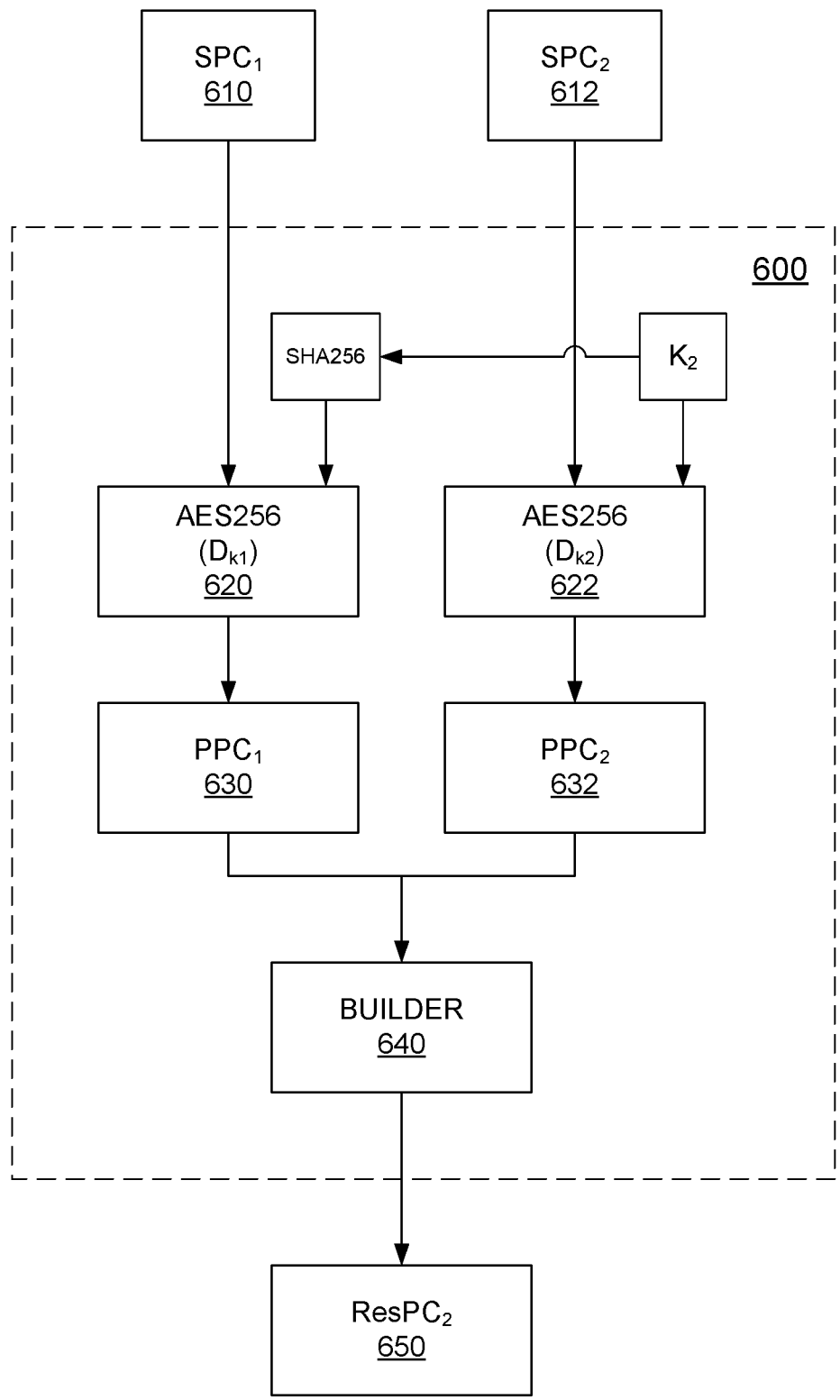
FIG. 6 is a block diagram of a system for generating a first intermediate resolution PC (ResPC$_2$) of the three resolutions in accordance with another implementation of the present disclosure.

FIG. 6 is a block diagram of a system 600 for generating a first intermediate resolution PC (ResPC$_2$) of the three resolutions in accordance with another implementation of the present disclosure. In the illustrated implementation of FIG. 6, the system 600 includes an AES256 descramblers (D$_{k1}$, D$_{k2}$) 620, 622 and a builder 640.

In one implementation, the AES256 descramblers (D$_{k1}$, D$_{k2}$) 620, 622 receive and descramble two scrambled PCs (SPC$_1$ and SPC$_2$) 610, 612 using two (K$_1$ and K$_2$) of the three secret keys, respectively. As described before, K$_3$ is generated as a 256-bit random number K$_3$. Then, K$_2$ and K$_1$ are calculated as K$_2$=SHA256 (K$_3$) and K$_1$=SHA256(K$_2$). Thus, the AES256 descrambler (D$_k$) 620 descrambles the scrambled PC$_1$ (SPC$_1$) 610 using the secret key K$_1$ to produce the partial PC$_1$ (PPC$_1$) 630, while the AES256 descrambler (D$_{k2}$) 622 descrambles the scrambled PC$_2$ (SPC$_2$) 612 using the secret key K$_2$, to produce the partial PC$_2$ (PPC$_2$) 632. The builder 640 then receives and transforms the partial PC$_1$ (PPC$_1$) 630 and the partial PC$_2$ (PPC$_2$)

TABLE 1

| FullPC | P1 | P2 | P3 | P4 | P5 | P6 | P7 | P8 | P9 | P10 | P11 | P12 | P13 | P14 | P15 | P16 |
|---|---|---|---|---|---|---|---|---|---|---|---|---|---|---|---|---|
| PPC1 | P1 | | | | | | | | | | | | | | | |
| PPC2 | P5 | P9 | P13 | | | | | | | | | | | | | |
| PPC3 | P2 | P3 | P4 | | P6 | P7 | P8 | P10 | P11 | P12 | P14 | P15 | P16 | | | |

However, in the system 400 of FIG. 4, the key management is more elaborated, where the packaging generates a 256-bit random number K$_3$. Then it calculates the keys K$_1$ and K$_2$ with the following equations:

$$K_2 = SHA256(K_3), \quad [5]$$

$$K_1 = SHA256(K_2) = SHA256(SHA256(K_3)). \quad [6]$$

That is, the cascading keys are generated using the one-way hashing functions (e.g., SHA256 functions) starting from the key dedicated to the highest resolution. Therefore, in FIG. 4, the AES256 scrambler (E$_{k3}$) 454 protects PPC$_3$ 434 using a secret key K$_3$ to produce a scrambled PC (SPC$_3$) 464. The scramblers (E$_{k1}$, E$_{k2}$) 450, 452 subsequently protect the other partial PCs using corresponding secret keys (K$_1$, K$_2$) generated using the SHA256 function (i.e., the one-way hashing function), as shown above, to produce the other scrambled PCs (SPC$_1$, SPC$_2$) 460, 462. Once the three scrambled PCs (SPC$_1$, SPC$_2$, SPC$_3$) 460, 462, 464 have been produced using the keys (K$_1$, K$_2$, K$_3$), the scrambled PCs and a selected key can be distributed to a receiver based on the appropriate resolution to be sent to the intended receiver.

Figure 5:
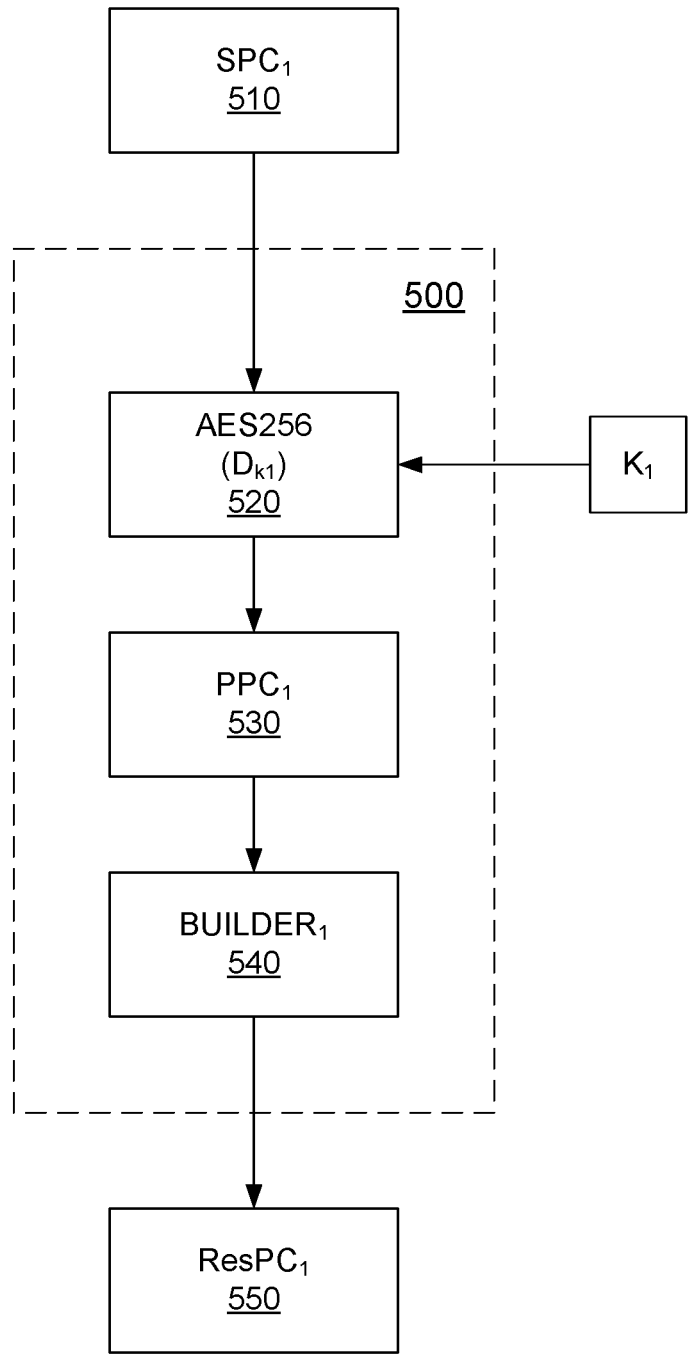
FIG. 5 is a block diagram of a system for generating a lowest resolution PC (ResPC$_1$) of the three resolutions in accordance with one implementation of the present disclosure.

FIG. 5 is a block diagram of a system 500 for generating a lowest resolution PC (ResPC$_1$) of the three resolutions in 632 into the first intermediate resolution PC (ResPC$_2$) 650 by recombining the partial PC$_1$ (PPC$_1$) 630 and the partial PC$_2$ (PPC$_2$) 632.

The following equation summarizes the system 600:

$$ResPC_2 = Builder_2(PPC_1, PPC_2) = Builder_2(D_{K_1}(SPC_1), D_{K_2}(SPC_2)). \quad [7]$$

By extension, the full resolution PC, in this implementation, can be expressed as follows:

$$FullPC = ResPC_3 = Builder_3(PPC_1, PPC_2, PPC_3)$$
$$= Builder_3(D_{K_1}(SPC_1), D_{K_2}(SPC_2), D_{K_3}(SPC_3)). \quad [8]$$

TABLE 2

| PPC1 | PP1 | | | |
|---|---|---|---|---|
| PPC2 | PP21 | Pp22 | PP23 | |
| ResPC2 | PP1 | PP21 | PP22 | PP23 |

Thus, as shown in Table 2, Builder$_2$ (equivalent to Builder 640 in FIG. 6) in Equation [7] works on slices of four points (see Table 2).

TABLE 3

| | | | | | | | | | | | | | | | |
|---|---|---|---|---|---|---|---|---|---|---|---|---|---|---|---|
| PPC1 | PP1 | | | | | | | | | | | | | | |
| PPC2 | PP21 | PP22 | PP23 | | | | | | | | | | | | |
| PPC3 | PP31 | PP32 | PP33 | PP34 | PP35 | PP36 | PP37 | PP38 | PP39 | PP40 | PP41 | PP42 | | | |
| FullPC | PP1 | PP31 | PP32 | PP33 | PP21 | PP34 | PP35 | PP36 | PP22 | PP37 | PP38 | PP39 | PP23 | PP40 | PP41 | PP42 |

As shown in Table 3, Builder in Equation [8], which builds the full PC, works on slices of 16 points.

In one implementation, if the distributor wants to grant only access to the lowest resolution PC (ResPC$_1$), it delivers only K$_1$. Further, the distributor may deliver all three scrambled PCs (SPC$_1$, SPC$_2$, SPC$_3$), but the user can only descramble scrambled PC$_1$ (SPC$_1$). If the distributor wants to grant access to the first intermediate resolution PC (ResPC$_2$), it delivers K$_2$. Otherwise, if the distributor wants to grant access to the full resolution, it delivers K$_3$.

Figure 7A:
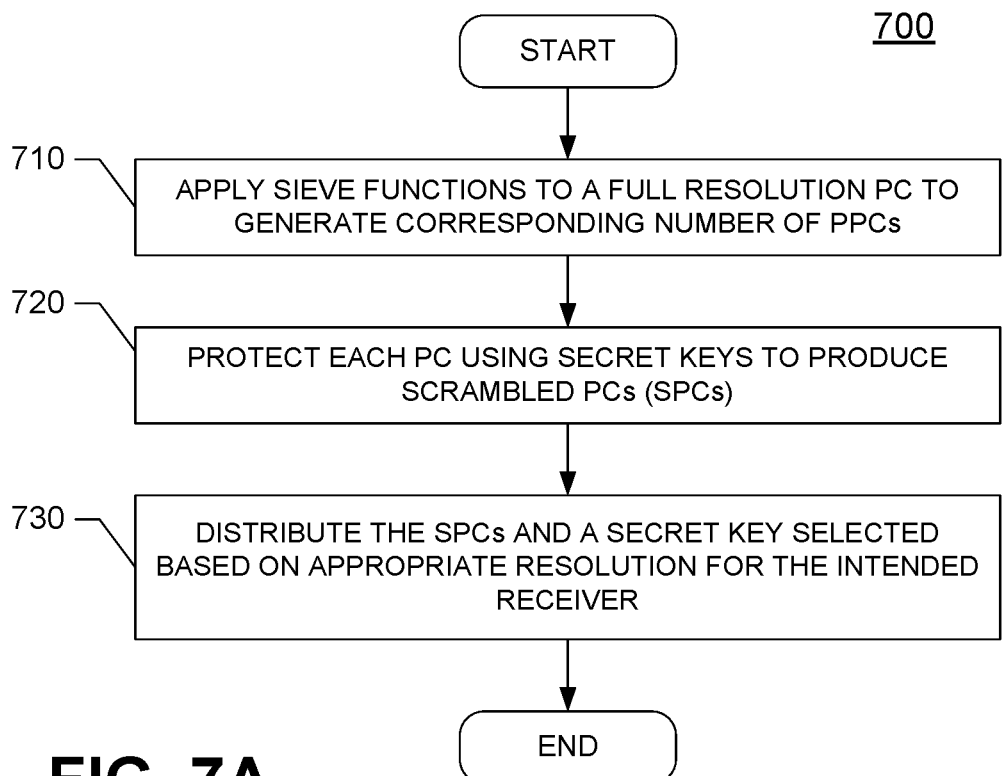
FIG. 7A is a flow diagram of a process for distributing different resolution PCs of a full resolution PC in accordance with one implementation of the present disclosure.

FIG. 7A is a flow diagram of a process 700 for distributing different resolution PCs of a full resolution PC in accordance with one implementation of the present disclosure. In the illustrated implementation of FIG. 7A, a plurality of sieve functions is applied, at block 710, to the full resolution PC to generate a corresponding number of partial PCs (corresponding to the number of sieve functions), which are disjointed elements. Thus, each sieve function decimates the full resolution PC and keeps some points following a given logic to generate disjointed partial PCs, which cover the entire full resolution PC.

Each PC of the corresponding number of partial PCs is then protected, at block 720, using the corresponding number of secret keys to produce the corresponding number of scrambled PCs. For example, PPC$_1$ is protected using a secret key K$_1$ to produce SPC$_1$, PPC$_2$ is protected using a secret key K$_2$ to produce SPC$_2$, and so on, until the corresponding number of partial PCs have been protected. The corresponding number of scrambled PCs and a secret key (selected based on an appropriate resolution for an intended receiver) are distributed, at block 730.

Figure 7B:
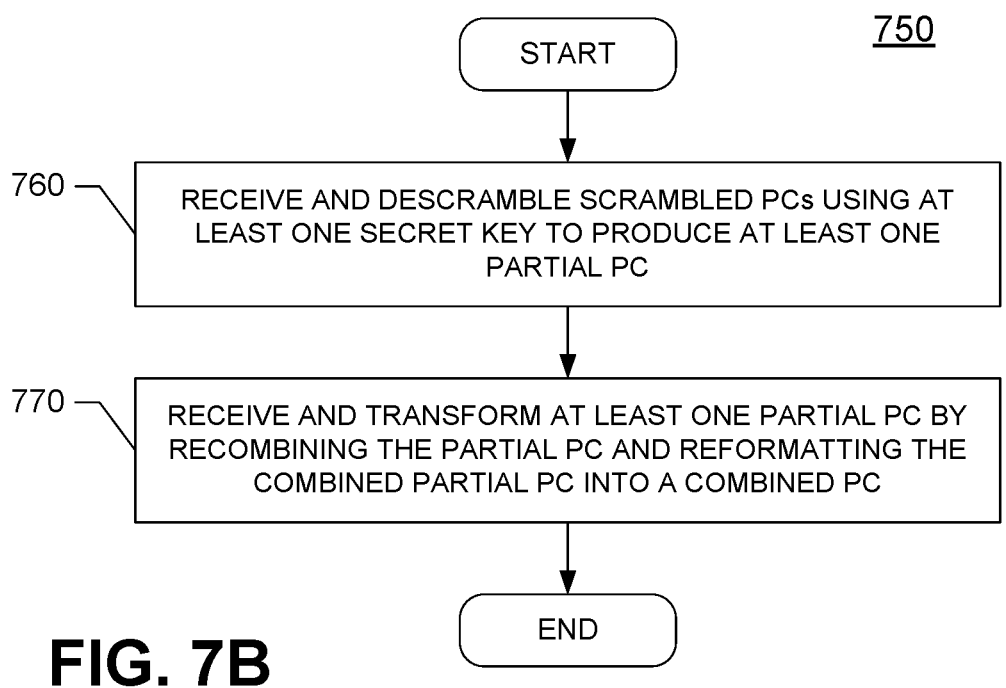
FIG. 7B is a flow diagram of a process for generating a desired resolution PC in accordance with one implementation of the present disclosure.

FIG. 7B is a flow diagram of a process 750 for generating a desired resolution PC in accordance with one implementation of the present disclosure. In the illustrated implementation of FIG. 7B, a plurality of scrambled PCs is received and descrambled, at block 760, using at least one secret key to produce at least one partial PC. Then, at block 770, the at least one partial PC is received and transformed by recombining the partial PCs and reformatting the combined partial PC into a combined PC.

In one implementation, the combined PC has a format compliant with tools that will use the combined PC. In one implementation, the combined PC is the desired resolution PC. In one implementation, a first secret key selected for a higher resolution PC than a second secret key selected for a lower resolution PC can be used to descramble the higher resolution PC and the lower resolution PC.

Figure 8:
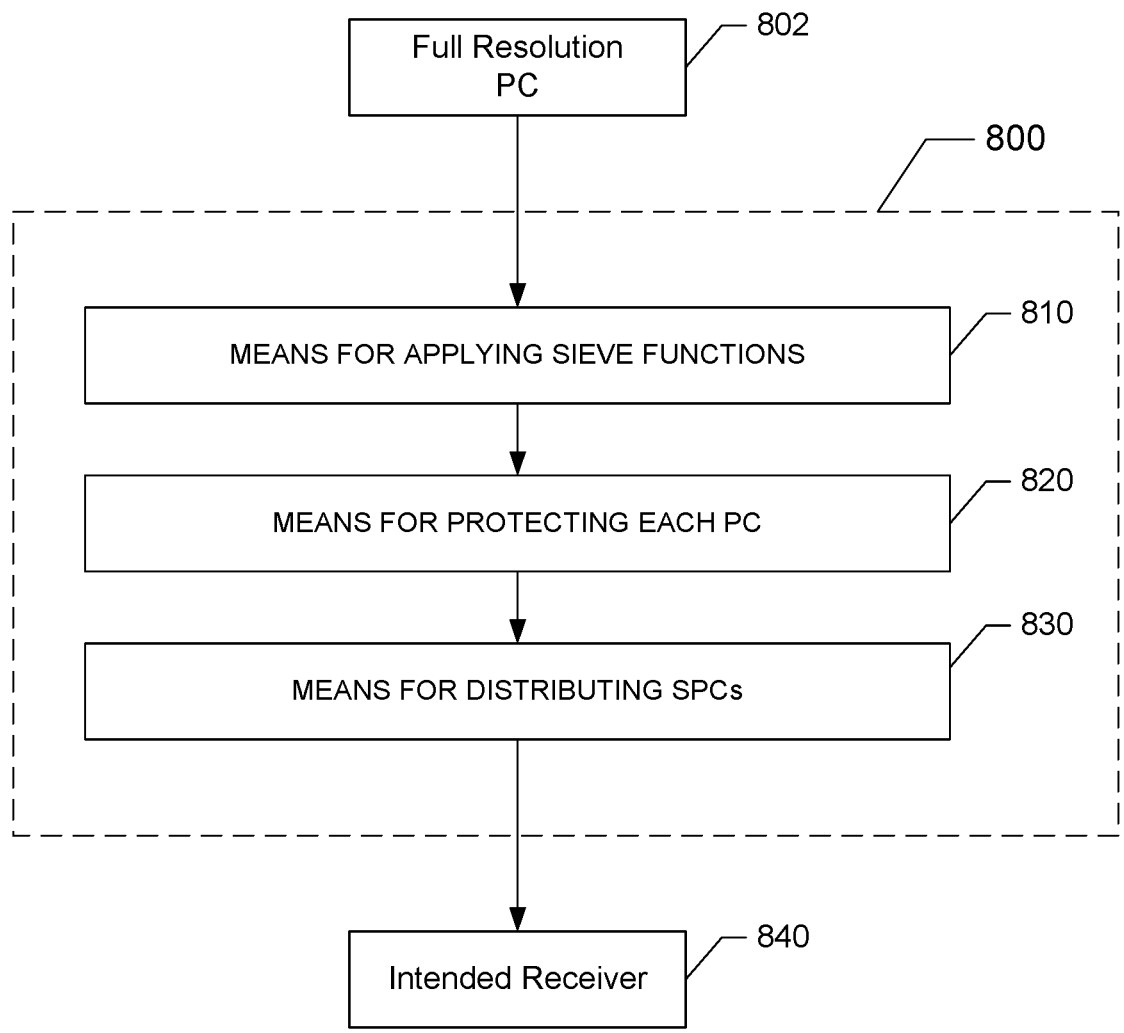
FIG. 8 is a block diagram of an apparatus for distributing different resolution PCs of a full resolution PC in accordance with one implementation of the present disclosure.

FIG. 8 is a block diagram of an apparatus 800 for distributing different resolution PCs of a full resolution PC in accordance with one implementation of the present disclosure. In the illustrated implementation of FIG. 8, the apparatus 800 includes means for applying sieve functions 810, means for protecting each PC 820, and means for distributing SPCs 830.

In one implementation, the means for applying sieve functions 810 applies a plurality of sieve functions to the full resolution PC to generate a corresponding number of partial PCs (corresponding to the number of sieve functions), which are disjointed elements. Thus, the means for applying sieve functions 810 uses each sieve function to decimate the full resolution PC and to keep some points following a given logic to generate disjointed partial PCs, which cover the entire full resolution PC.

In one implementation, the means for protecting each PC 820 protects each PC of the corresponding number of partial PCs using the corresponding number of secret keys to produce the corresponding number of scrambled PCs. For example, PPC$_1$ is protected using a secret key K$_1$ to produce SPC$_1$, PPC$_2$ is protected using a secret; key K$_1$ to produce SPC$_2$, and so on, until the corresponding number of partial PCs have been protected. In one implementation, the means for protecting each PC 820 is a scrambler. In another implementation, the means for protecting each PC 820 is an AES scrambler.

In one implementation, the means for distributing SPCs 830 distributes: (1) the corresponding number of scrambled PCs; and (2) a secret key, which is selected based on an appropriate resolution for an intended receiver. In one implementation, the number of scrambled PCs distributed is equal to the number of scrambled PCs generated by the means for protecting each PC 620. In another implementation, only the scrambled PCs that are necessary to descramble to the appropriate resolution for the selected key are distributed.

Figure 9A:
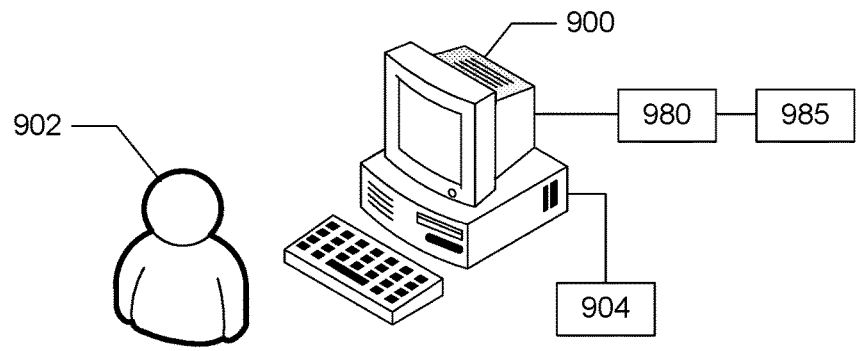
FIG. 9A is a representation of a computer system and a user in accordance with an implementation of the present disclosure.

FIG. 9A is a representation of a computer system 900 and a user 902 in accordance with an implementation of the present disclosure. The user 902 uses the computer system 900 to implement a PC distribution application 990 as illustrated and described with respect to the PC distribution system 100 of the block diagram shown in FIG. 1 and the process 700 illustrated in FIG. 7.

Figure 9B:
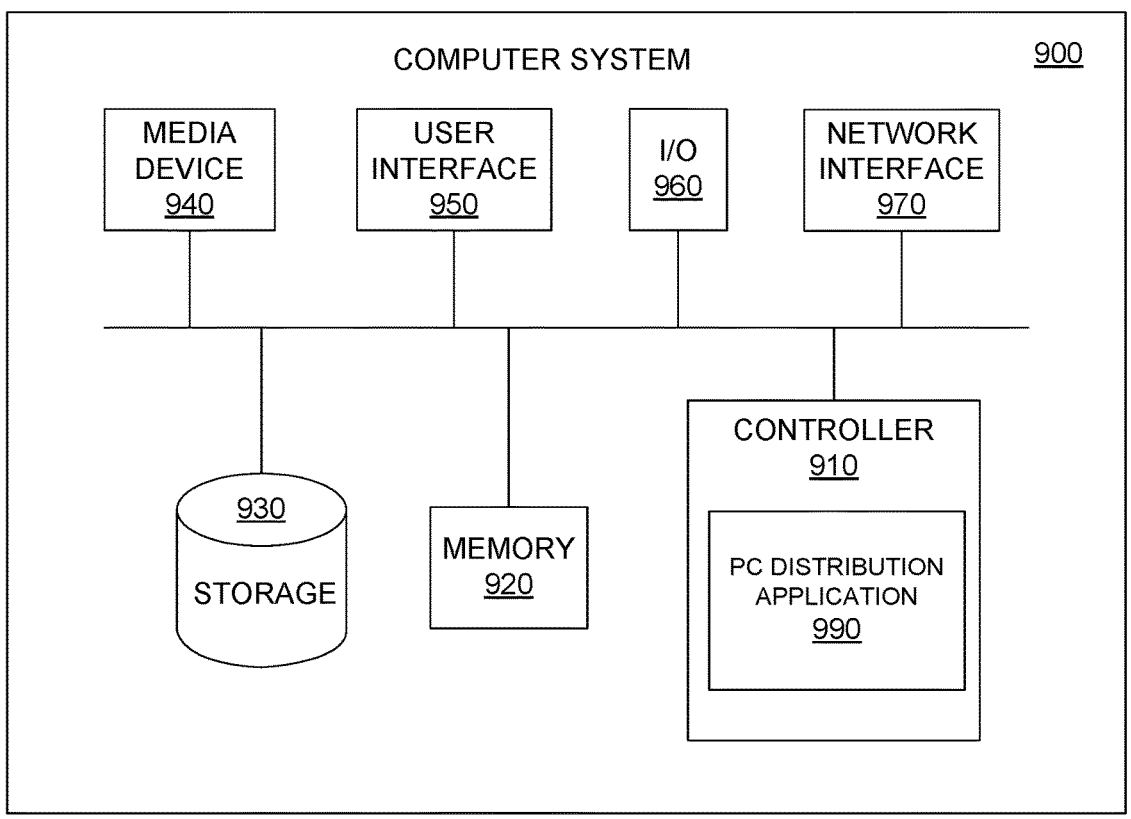
FIG. 9B is a functional block diagram illustrating the computer system hosting the PC distribution application in accordance with an implementation of the present disclosure.

The computer system 900 stores and executes the PC distribution application 990 of FIG. 9B. In addition, the computer system 900 may be in communication with a software program 904. Software program 904 may include the software code for the PC distribution application 990. Software program 904 may be loaded on an external medium such as a CD, DVD, or a storage drive, as will be explained further below.

Furthermore, computer system 900 may be connected to a network 980. The network 980 can be connected in various different architectures, for example, client-server architecture, a Peer-to-Peer network architecture, or other type of architectures. For example, network 980 can be in communication with a server 985 that coordinates engines and data used within the PC distribution application 990. Also, the network can be different types of networks. For example, the network 980 can be the Internet, a Local Area Network or any variations of Local Area Network, a Wide Area Network, a Metropolitan Area Network, an Intranet or Extranet, or a wireless network.

FIG. 9B is a functional block diagram illustrating the computer system 900 hosting the PC distribution application 990 in accordance with an implementation of the present disclosure. A controller 910 is a programmable processor and controls the operation of the computer system 900 and its components. The controller 910 loads instructions (e.g., in the form of a computer program) from the memory 920 or an embedded controller memory (not shown) and executes these instructions to control the system. In its execution, the controller 910 provides the PC distribution application 990 with a software system, such as to enable the creation and configuration of engines and data extractors within the PC distribution application 990. Alternatively, this service can be implemented as separate hardware components in the controller 910 or the computer system 900.

Memory 920 stores data temporarily for use by the other components of the computer system 900. In one implementation, memory 920 is implemented as RAM. In one implementation, memory 920 also includes long-term or permanent memory, such as flash memory and/or ROM.

Storage 930 stores data either temporarily or for long periods of time for use by the other components of the computer system 900. For example, storage 930 stores data used by the PC distribution application 990. In one implementation, storage 930 is a hard disk drive.

The media device 940 receives removable media and reads and/or writes data to the inserted media. In one implementation, for example, the media device 940 is an optical disc drive.

The user interface 950 includes components for accepting user input from the user of the computer system 900 and presenting information to the user 902. In one implementation, the user interface 950 includes a keyboard, a mouse, audio speakers, and a display. The controller 910 uses input from the user 902 to adjust the operation of the computer system 900.

The I/O interface 960 includes one or more I/O ports to connect to corresponding I/O devices, such as external storage or supplemental devices (e.g., a printer or a PDA). In one implementation, the ports of the I/O interface 960 include ports such as: USB ports, PCMCIA ports, serial ports, and/or parallel ports. In another implementation, the I/O interface 960 includes a wireless interface for communication with external devices wirelessly.

The network interface 970 includes a wired and/or wireless network connection, such as an RJ-45 or "Wi-Fi" interface (including, but not limited to 802.11) supporting an Ethernet connection.

The computer system 900 includes additional hardware and software typical of computer systems (e.g., power, cooling, operating system), though these components are not specifically shown in FIG. 9B for simplicity. In other implementations, different configurations of the computer system can be used (e.g., different bus or storage configurations or a multi-processor configuration).

In one implementation, the PC distribution system 100 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the PC distribution system 100 is configured with a combination of hardware and software. For example, the sieve functions 120, 122, 124 are configured with software residing within a separate processor, while the scrambler 150 is configured as hardware.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A point cloud distribution system to distribute content including multiple resolutions of a full resolution point cloud (PC) to recipients, comprising:
a controller including:
a plurality of sieve function generators to apply sieve functions on the full resolution PC to generate a plurality of partial point clouds (PPCs) for distributing PCs of different resolutions,
wherein the plurality of PPCs is a group of disjointed elements which together makes up the full resolution PC;
a plurality of scramblers to scramble the plurality of PPCs using a plurality of secret keys to produce a plurality of scrambled PCs, wherein each secret key of the plurality of secret keys scrambles each PPC of the plurality of PPCs for one particular resolution of the multiple resolutions; and a distributor to distribute at least one scrambled PC and at least one selected secret key, wherein the at least one selected secret key is selected based on an appropriate resolution determined for an intended recipient, and wherein the distributor distributes the at least one scrambled PC of the appropriate resolution without causing the point cloud distribution system to increase an overall size of the content.

2. The system of claim 1, wherein a first secret key is selected for a first PPC, a second secret key is selected for a second PPC that is higher resolution than the first PPC, and the first key can be derived from the second secret key.

3. The system of claim 1, wherein cascading secret keys of the plurality of secret keys are generated using one-way hashing functions starting from a secret key that can recreate the full resolution PC.

4. A receiver system for receiving and generating a desired resolution point cloud (PC), the system comprising:
a controller including:
a plurality of descramblers to receive and descramble a plurality of scrambled point clouds (PCs) using at least one secret key to produce at least one partial PC (PPC), wherein the at least one secret key is selected based on an appropriate resolution determined for the receiver system,
wherein the at least one PPC is generated for distributing PCs of different resolutions,
wherein the plurality of scrambled PCs is distributed without causing an increase in an overall size of distributed content.

5. The system of claim 4, wherein the combined PC has a format compliant with tools that will use the combined PC.

6. The system of claim 4, wherein the combined PC is the desired resolution PC.

7. The system of claim 4, wherein a first secret key is selected for a first PPC, a second secret key is selected for a second PPC that is higher resolution than the first PPC, and the first key descrambles both the first PPC and the second PPC.

8. A method for distributing content including different resolution point clouds of a full resolution point cloud (PC) to distribute a plurality of partial point clouds (PPCs) to recipients, the method comprising:
applying a plurality of sieve functions to the full resolution PC to generate the plurality of PPCs for distributing PCs of different resolutions,
wherein the plurality of PPCs are disjointed elements of the full resolution PC;
scrambling each PPC of the plurality of PPCs using a respective one of a plurality of secret keys,
wherein each secret key of the plurality of secret keys scrambles each PPC of the plurality of PPCs for one particular resolution of multiple resolutions; and
distributing at least one scrambled PC and a selected secret key to an intended recipient,
wherein the selected secret key is selected based on an appropriate resolution determined for the intended recipient, and
wherein the at least one scrambled PC is distributed without increasing an overall size of the content.

9. The method of claim 8, wherein applying a plurality of sieve functions comprises
decimating the full resolution PC to generate disjointed PPCs using each sieve function of the plurality of sieve functions.

10. The method of claim 9, wherein disjointed PPCs form the full resolution PC.

11. The method of claim 8, wherein a number of the plurality of sieve functions is equal to a number of the plurality of PPCs.

12. The method of claim 8, wherein a number of the plurality of sieve functions is equal to a number of the plurality of secret keys.

13. The method of claim 8, wherein the selected secret key is able to descramble at least one of the at least one scrambled PC.

14. The method of claim 8, wherein a first secret key is selected for a first PPC, a second secret key is selected for a second PPC that is higher resolution than the first PPC, and the first key can be derived from the second secret key.

15. An apparatus for distributing content including different resolution point clouds of a full resolution point cloud (PC) to distribute a plurality of partial point clouds (PPCs) to recipients, the apparatus comprising:
a programmable processor including:
means for applying a plurality of sieve functions to the full resolution PC to generate the plurality of PPCs for distributing PCs of different resolutions,
wherein the plurality of PPCs are disjointed elements of the full resolution PC;
means for protecting to protect each PPC of the plurality of PPCs using a respective one of a plurality of secret keys,
wherein each secret key of the plurality of secret keys scrambles each PPC of the plurality of PPCs for one particular resolution; and
means for distributing to distribute at least one scrambled PC and a selected secret key to an intended recipient, wherein the selected secret key is selected based on an appropriate resolution determined for the intended recipient, and
wherein the at least one scrambled PC is distributed without increasing an overall size of the content.

16. The apparatus of claim 15, wherein only scrambled PCs that are necessary to descramble to the appropriate resolution for the selected key are distributed.

17. The apparatus of claim 15, wherein the means for protecting is a scrambler.

18. The apparatus of claim 15, wherein the means for protecting is an AES scrambler.

* * * * *